United States Patent
Turcotte et al.

(10) Patent No.: US 6,546,250 B1
(45) Date of Patent: Apr. 8, 2003

(54) MOBILE STATION PREFERENCES IN A MULTIPLE HYPERBAND CAPABLE CELLULAR COMMUNICATIONS SYSTEM

(75) Inventors: Eric Turcotte, Verdun (CA); Richard Brunner, Montreal (CA)

(73) Assignee: Telefonaktiebolaget LM Ericsson (publ) (SE)

(*) Notice: Subject to any disclaimer, the term of this patent is extended or adjusted under 35 U.S.C. 154(b) by 1178 days.

(21) Appl. No.: 08/771,426

(22) Filed: Dec. 20, 1996

Related U.S. Application Data

(63) Continuation of application No. 08/423,942, filed on Apr. 19, 1995, now abandoned.

(51) Int. Cl.⁷ .................................................. H04Q 7/20
(52) U.S. Cl. ..................................... 455/437; 455/552
(58) Field of Search ................................ 455/422, 426, 455/432, 436, 438, 439, 440, 441, 444, 450, 452, 524, 525, 550, 552–553, 560, 437, 67.1

(56) References Cited

U.S. PATENT DOCUMENTS

| | | | | |
|---|---|---|---|---|
| 4,916,728 A | | 4/1990 | Blair ........................... 379/59 |
| 5,293,641 A | | 3/1994 | Kallin et al. .................. 455/33 |
| 5,402,523 A | * | 3/1995 | Berg ......................... 455/67.1 |
| 5,406,615 A | | 4/1995 | Miller, II et al. ............. 379/60 |
| 5,432,843 A | * | 7/1995 | Bonta ......................... 455/438 |
| 5,491,834 A | | 2/1996 | Chia ............................ 455/33 |
| 5,499,386 A | * | 3/1996 | Karlsson ...................... 455/437 |
| 5,506,887 A | | 4/1996 | Emery et al. ................. 379/58 |
| 5,603,081 A | | 2/1997 | Raith et al. ................... 455/33 |
| 5,613,204 A | | 3/1997 | Haberman et al. |
| 5,623,535 A | * | 4/1997 | Leung et al. ................. 455/444 |
| 5,666,650 A | * | 9/1997 | Turcotte et al. ............. 455/509 |

OTHER PUBLICATIONS

Ph.Duplessis, P.Simmons; *Towards A Combined GSM 900 DCS 1800 System*, Matra Communication, France; Dec. 1–3, 1992; pp. 89–92.

Enrico Del Re; *The GSM Procedures In An Integrated Cellular/Sattelllite System*; IEEE Journal on Selected Areas of Communications; New York, NY; Feb. 13, 1995; pp. 421–430.

* cited by examiner

*Primary Examiner*—Nguyen T. Vo
(74) *Attorney, Agent, or Firm*—Jenkens & Gilchrist, P.C.

(57) ABSTRACT

A multiple hyperband capable mobile station is programmed with either or both hyperband and frequency band communications selection criteria. The selection criteria utilized include restricting operation to certain hyperbands and/or frequency bands, preferring operation in certain hyperbands and/or frequency bands, and prioritizing operation to certain hyperbands and/or frequency bands. The programmed hyperband selection criteria facilitate control over server selection by the mobile station in response to a received neighbor list of a hyperband and frequency bands (and the channels therein) for effectuating cellular communications. The selection criteria for a mobile station are further transmitted to the system from the mobile station for use in making mobile station hand-off determinations.

17 Claims, 2 Drawing Sheets

MOBILE STATION PREFERENCES IN A MULTIPLE HYPERBAND CAPABLE CELLULAR COMMUNICATIONS SYSTEM

This application is a continuation of application Ser. No. 08/423,942, filed Apr. 19, 1995.

BACKGROUND OF THE INVENTION

1. Technical Field of the Invention

The present invention relates to cellular communications systems and, in particular, to a multiple hyperband cellular communications system and multiple hyperband capable mobile stations for operation therein.

2. Description of Related Art

North American cellular communications have historically been implemented solely in the 800 MHZ Cellular hyperband. The most recent evolution in cellular communications services involves the adoption of three additional hyperbands for use in handling mobile and personal communications. Of these additional hyperbands, only the Personal Communication Services (PCS) hyperband in the 1900 MHZ frequency range has been completely defined. With the existence of the new PCS hyperband, different types of subscriptions and or services like speech quality, voice privacy, and encryption may exist for one mobile station from one hyperband to another, or from one frequency band in the Cellular hyperband to another frequency band in the PCS hyperband.

The Cellular hyperband is assigned two telephone frequency bands (commonly referred to as the A frequency band and the B frequency band) for carrying and controlling communications. The PCS hyperband, on the other hand, is specified in the United States of America to include six different frequency bands (A, B, C, D, E and F). Thus, in accordance with EIA/TIA Interim Standard IS-136 (the "IS-136 specification") and the PN3388-1 specification version of Sep. 9, 1994, eight frequency bands are now available in any given service area to facilitate cellular and personal communications services.

Each one of frequency bands specified for the Cellular and PCS hyperbands is allocated a plurality of voice or speech channels and at least one access or control channel. The control channel is used to control or supervise the operation of mobile stations by means of information transmitted to and received from the mobile stations. Such information may include incoming call signals, outgoing call signals, page signals, page response signals, location registration signals, voice channel assignments, maintenance instructions, and cell selection or reselection instructions as a mobile station travels out of the radio coverage of one cell and into the radio coverage of another cell. The voice channel is used to carry subscriber telephonic communications as well as messages requesting mobile station assistance in making hand-off evaluations. The control and voice channels may operate in either an analog mode, a digital mode, or a combination mode.

The individual frequency bands are typically assigned to, and provided within a hyperband for the service area by only one service company. For example, the A frequency band of the Cellular hyperband is usually reserved for use by non-wire line communications service companies, and the B frequency band is usually reserved for use by wire line communications service companies. In some instances, a frequency band assigned to one service company for a given cell or service area may be assigned to a different service company in another cell or service area. It should also be recognized that the same service company may provide cellular communications service in multiple frequency bands within either a single hyperband or across multiple hyperbands.

Cellular hyperband mobile stations have historically been configured to operate in a particular one of the available frequency bands within the Cellular hyperband. For example, if the service company providing cellular service to the subscriber is a wire line company, the Cellular hyperband mobile station is configured with the B frequency band as its "home" frequency band. Reciprocal billing arrangements between service companies allow subscribers to place calls over non-home frequency bands in the event the mobile station is roaming. These non-home calls, however, typically require payment by the subscriber of some form of a surcharge and are therefore undesirable. Furthermore, in the absence of an agreement between service companies, roaming subscribers may not be able to make a call in a non-home frequency band without operator assistance. For the service provider, use of non-home frequency bands by subscribers results in a potential loss of revenue that the provider would like to avoid.

The expansion to multiple hyperband communications capabilities as a result of the IS-136/PN3388 specification has necessitated the development and placement into service of mobile stations that are capable of accessing both the Cellular and PCS hyperbands. Furthermore, the existence of multiple available hyperbands for carrying mobile station communications presents an opportunity for cellular telephone switches to control overlapping or adjacent cells in different hyperbands. It would be beneficial if the cellular communications system were configured from both the system and terminal point of view to allow multiple hyperband capable mobile stations to operate seamlessly between the available hyperbands. At the same time, however, some control over which hyperband and frequency band therein that are accessed by the mobile station must be maintained in order to avoid subscriber surcharges and enable service providers to derive revenue from use of their own bands.

SUMMARY OF THE INVENTION

The present invention comprises a mobile station capable of accessing for communications multiple frequency bands across multiple available hyperbands. In order to control which of the available hyperbands will be accessed, the mobile station of the present invention is programmed with hyperband and frequency band selection criteria. The programmed selection criteria may either restrict mobile station operation to one or more hyperbands or frequency bands, prefer operation in one or more hyperbands and/or frequency bands, and/or prioritize operation in certain hyperbands or frequency bands. For server selection in the idle operating mode, the mobile station evaluates the neighbor list broadcast by the communications system and, in response to the neighbors identified therein, selects in accordance with programmed selection criteria not only which one or ones of the available hyperbands should be used for mobile station communications, but also which one or ones of the available frequency bands within the selected hyperband should be used for mobile station communications. For hand-off while in the call processing mode, the mobile station transmits the programmed selection criteria at cellular system request for subsequent use by the system in selecting a hyperband and frequency band for communications.

The present invention further comprises a method for operating multiple hyperband capable mobile stations within a multiple hyperband cellular communications system. In accordance with the method, mobile stations are programmed with hyperband and/or frequency band selection criteria. In response to receipt of a neighbor list, the programmed mobile station evaluates the available neighbors on the list in view of its programmed selection criteria, and then selects an appropriate hyperband and/or frequency band in a server selection determination. The mobile station further transmits its programmed selection criteria to the communications system for system use in making hand-off determinations.

The present invention still further comprises a method for operating a multiple hyperband cellular communications system wherein multiple hyperband capable mobile stations are programmed with hyperband and/or frequency band selection criteria. The system generates and transmits to each mobile station a neighbor list identifying available neighbors. In response to receipt of the transmitted neighbor list, the mobile stations evaluate the identified available neighbors in view of their programmed selection criteria, and an appropriate hyperband or frequency band in a serving cell is selected for communications. The system further evaluated mobile station programmed selection criteria received from mobile stations in making hand-off determinations.

The present invention still further comprises a multiple hyperband communications system implementing the foregoing methods of programming mobile stations and using the programming to select appropriate hyperbands or frequency bands in either server selection or hand-off determination.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF EMBODIMENTS

Figure 1:
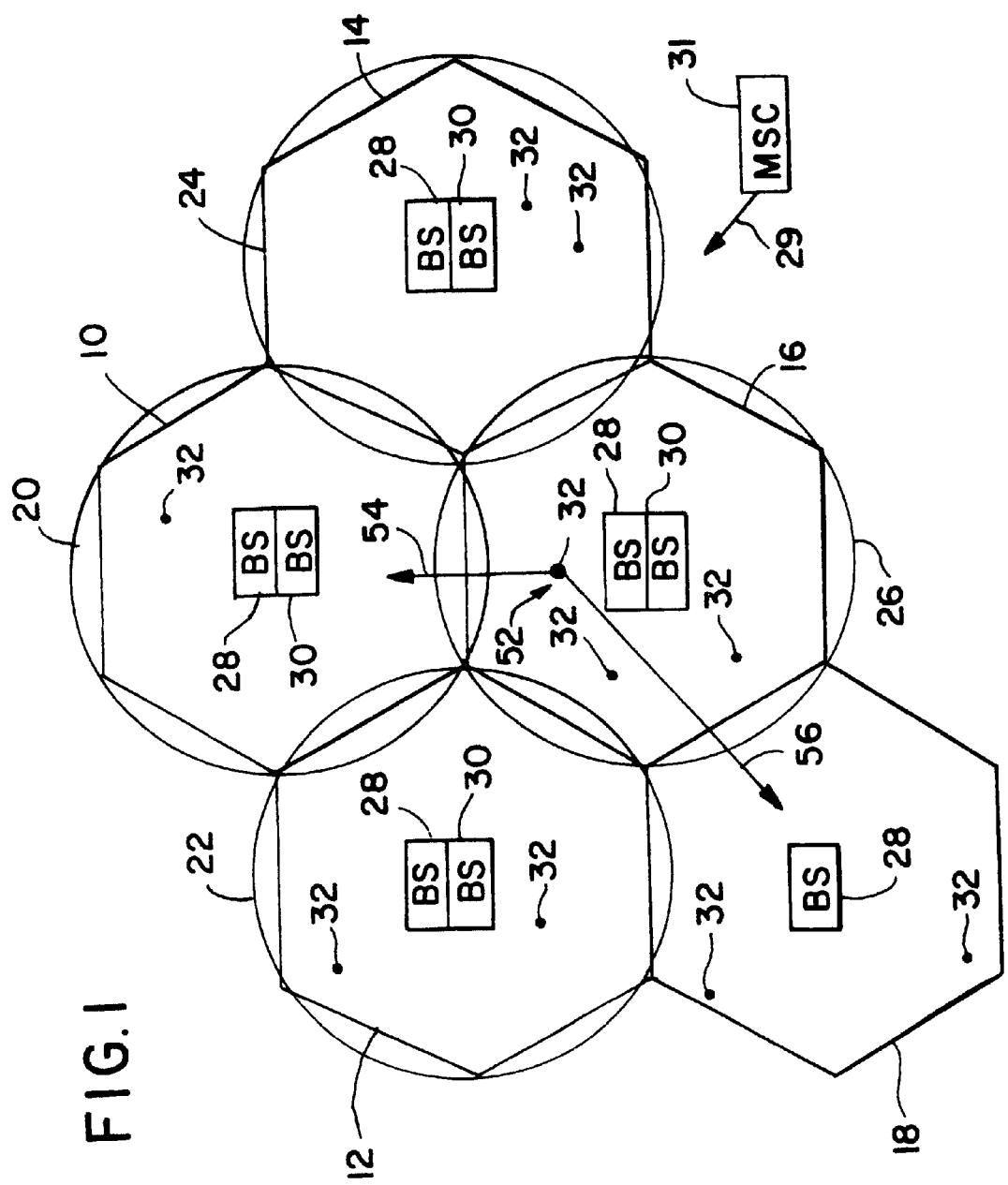
FIG. 1 is a cell diagram illustrating an exemplary cell configuration for a multiple hyperband cellular communications system of the present invention.

Reference is now made to FIG. 1 wherein there is shown a cell diagram illustrating an exemplary cell configuration for a multiple hyperband cellular communications system according to the present invention. An arbitrary geographic area (hereinafter "the service area") is divided into a plurality of cells 10–18 and 20–26 utilizing both the Cellular and PCS hyperbands. The cells 10–18 are represented by hexagrams and comprise communications cells wherein as many as two separate frequency bands (A and B) of radio frequency cellular communications are provided via multiple channels in the Cellular hyperband. Cells 20–26, on the other hand, are represented by circles and comprise communications cells wherein as many as six separate frequency bands (A through F) of radio frequency cellular communications are provided to mobile stations via multiple channels in the PCS hyperband.

Each of the Cellular hyperband cells 10–18 includes at least one base station 28 configured to facilitate communications over certain channels in at least one of the two available Cellular hyperband frequency bands. Similarly, each of the PCS hyperband cells 20–26 includes at least one PCS base station 30 configured to facilitate communications over certain channels in at least one of the six available PCS hyperband frequency bands. It will, of course, be understood that each cell 10–18 and each cell 20–26 may include more than one base station 28 and 30, respectively, if needed, as different service companies may be providing cellular communications services on different frequency bands within the same cell.

The base stations 28 and 30 are illustrated as being positionally located at or near the center of each of the cells 10–18 and 20–26, respectively. However, depending on geography and other known factors, the base stations 28 and 30 may instead be located at or near the periphery of, or otherwise away from the centers of, each of the cells 10–18 and 20–26. In such instances, the base stations 28 and 30 may broadcast and communicate with mobile stations 32 located within the cells 10–18 and 20–26 26 using directional rather than omni-directional antennas. Each one of the base stations 28 and 30 includes a transmitter, a receiver, and a base station controller connected to the antenna in a manner and with a configuration well known in the art. The base stations 28 and 30 are connected (as generally indicated by arrow 29) to at least one mobile switching center 31.

There are a number of mobile stations 32 shown operating within the service area of the system of the present invention. These mobile stations 32 each possess the requisite functionality for operating in both the Cellular hyperband and the PCS hyperband (i.e., they are multiple hyperband communications capable). The configuration and operation of the mobile stations 32 will be described in more detail herein with respect to FIG. 2. It will, of course, be understood that existing Cellular hyperband only capable mobile stations (not shown) are compatible with the system of the present invention, but will only be able to communicate within Cellular hyperband cells 10–18. Similarly, PCS hyperband only capable mobile stations (not shown) are compatible with the system of the present invention, but will only be able to communicate within PCS hyperband cells 20–26.

As the mobile stations 32 move within the service area, there will be instances where a mobile station will pass from one of the cells 10–18 or 20–26 to another of the cells. In moving from one of the cells 10–18 or 20–26 to another of the cells, the mobile stations 32, in conjunction with base station 28 and 30 information and orders exchanged with the mobile switching center 31, will have an opportunity through either server selection or hand-off to change the base station through which cellular radio communications are being effectuated. Because the system comprises a multiple hyperband communications system, by moving between cells and changing base stations as a result thereof, the mobile stations 32 may further change the hyperband over which communications are being effectuated.

Figure 2:
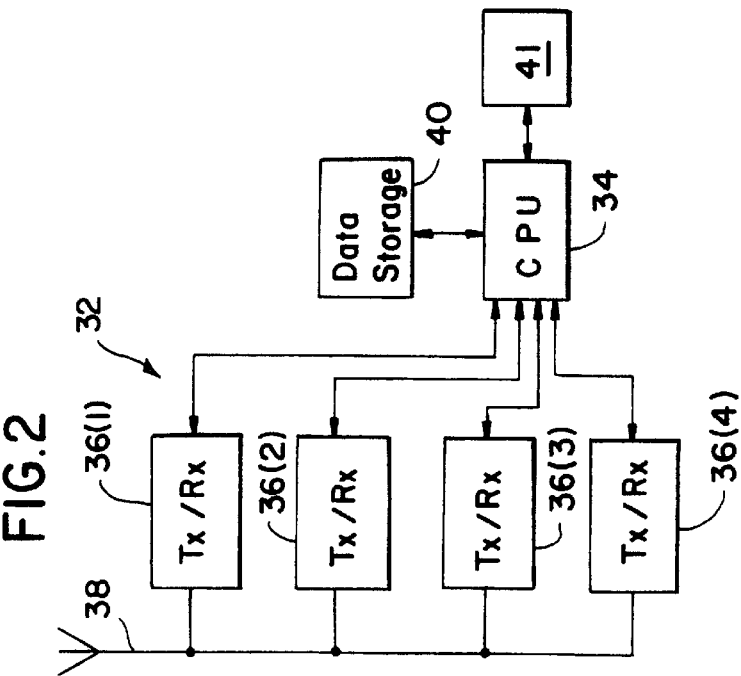
FIG. 2 is a simplified block diagram of a multiple hyperband mobile station programmable with hyperband and frequency band selection criteria in accordance with the present invention.

Reference is now made to FIG. 2 wherein there is shown an example of a simplified block diagram of a multiple hyperband mobile station 32 of the present invention. The mobile station 32 includes a processor (CPU) 34 connected to a plurality of transceivers 36. The transceivers 36 are each configured to operate in the frequency bands and channels of a different hyperband. For example, the transceiver 36(1) functions on multiple channels in at least one of the frequency bands of the 800 MHZ frequency range, and is thus utilized by the mobile station 32 for communicating over the Cellular hyperband. The transceiver 36(2), on the other hand, functions on multiple channels in at least one of the frequency bands of the 1900 MHZ frequency range, and is thus utilized by the mobile station 32 for communicating over the PCS hyperband. The remaining transceivers 36(3) and 36(4), if included, function in other frequency ranges; for example, comprising those additional frequency ranges identified by the IS-136/PN3388 specifications for other soon to be made available hyperbands. By means of an output signal from the processor 34, the frequency band and precise channel therein on which the transceivers 36 operate for communications may be selected. An antenna 38 is connected to the transceivers 36 for transmitting and receiving radio communications (both voice and data) over the cellular communications network utilizing, for example, the base stations 28 and 30 of FIG. 1. A data storage device 40 (preferably in the form of a read only memory—ROM—and a random access memory—RAM) is also connected to the processor 34. The data storage device 40 is used for storing programs and data executed by the processor 34 in controlling operation of the mobile station 32. There are other components 41 included in the mobile station 32 (like a handset, keypad, etc.) and not specifically shown in FIG. 2 whose nature, operation and interconnection with the illustrated components are well known to those skilled in the art.

The primary modes of operation of the mobile station 32 are: an idle operating mode, wherein the mobile station awaits use through either the receipt or initiation of a cellular telephone call; and, an on call operating mode, wherein the mobile station is being used by the subscriber to engage in a cellular telephone communication. While in the idle operating mode, the mobile station 32 receives a neighbor list from the cellular system via a communications broadcast from the base stations 28 or 30 identifying cell neighbors (i.e., other base stations) that are available for server selection when the mobile station moves through the service area and passes across cell boundaries. Similarly, while in the on call operating mode, the mobile station 32 receives on a dedicated channel a neighbor list identifying cell neighbors that the mobile station should scan for and measure and report on for purposes of assisting the mobile switching center 31 in making a hand-off determination as the mobile station moves from cell to cell.

When making the server selection determination, the mobile station 32 is presented via the neighbor list with an opportunity to choose from a number of potential cell candidates in different frequency bands and across multiple hyperbands. Similarly, when assisting in the hand-off evaluation, the mobile station 32 is presented with a MAHO neighbor list identifying potential cell candidates in different frequency bands and across multiple hyperbands. From the points of view of both the subscriber and the service provider, however, some of the potential candidates for server selection and hand-off are more preferable than other candidates. For example, the service provider for a particular subscriber may be assigned communications service in only certain ones of the frequency bands across the available hyperbands. It is from subscriber use of channels in these frequency bands that the service provider will derive the most revenue. Thus, the service provider would prefer that the mobile stations it places into service operate only, or preferentially operate only in those frequency bands. The subscriber also has a financial interest in mobile station frequency band selection as operation in a foreign frequency band at best may incur payment by the subscriber of a surcharge and at worst may not be possible without operator assistance.

The mobile station 32 of the present invention advantageously utilizes the data storage device 40 and processor 34 to assist in the efficient and economical selection of cells. In accordance with the present invention, the mobile station 32 is programmed with hyperband and/or frequency band selection criteria. The criteria are stored in the data storage device 40, such storage perhaps taking the form of a linked list, an array or any other suitable programming technique for storing and retrieving information within a memory. In accordance with the teachings of such programming techniques, the selection criteria can be of variable size defined by the desired number of entries and/or the available programmable memory space within the mobile station 32.

The selection criteria stored in the data storage device 40 of the mobile station 32 may comprise a restrictive list specifying only those hyperbands or frequency bands within which the mobile station is authorized for communications. Alternatively, the stored selection criteria may comprise a preferential list specifying those hyperbands or frequency bands within which the mobile station is preferred, but not necessarily limited, for communications. Another possibility is that the stored selection criteria may comprise a priority list identifying (in order) the hyperbands that should be considered in making any hyperband selection.

With respect to implementing hyperband restrictions and preferences in the stored selection criteria, any one of the following categories may be programmed into the mobile station 32 to specify the manner of hyperband selection: (1) "Cellular Only" (i.e., restricted to operation in the Cellular hyperband); (2) "PCS Only" (i.e., restricted to operation in the PCS hyperband); (3) "Cellular Preferred" (i.e., operation in either hyperband allowed, but preferred operation in the Cellular hyperband); (4) "PCS Preferred" (i.e., operation in either hyperband allowed, but preferred operation in the PCS hyperband); and (5) "Both Cellular and PCS" (i.e., operation in either hyperband allowed without any preference). It will, of course, be understood that the foregoing categories may be modified and other hyperband programming categories may be specified and programmed into the mobile station 32 of the present invention as needed (for example, a priority list). In fact, the mobile station 32 could be further programmed to download such selection criteria via a communication transmitted over the cellular network using base stations 28 and 30. Such modified or additional categories will allow mobile station preferences to be conveniently changed, and thus allow service providers to account (without a mobile station recall) for the service changes potentially involving future implementation into service of other IS-136/PN3388 specification hyperbands.

The mobile station 32 of the present invention is additionally programmed with frequency band selection criteria comprising restrictions, preferences and priorities. For restrictions, the mobile station 32 will be programmed identifying for communications only certain ones of the available frequency bands across the hyperbands that may be selected. For preferences, a number of different preference options and prioritizations like those discussed above with respect to hyperband selection may be programmed into the mobile station 32. As with the hyperband selection criteria categories, the frequency band selection criteria may be modified and other frequency band selection criteria may be specified and programmed into the mobile station 32 of the present invention as needed (with a priority list, for example). Downloading of such selection criteria via a communication transmitted over the cellular network to the mobile station 32 for storage in the data storage device 40 is also available to allow service providers to account for service changes potentially involving future implementation into service of other IS-136/PN3388 specification hyperbands.

One preference technique programmed into the mobile station 32 of the present invention in connection with the selection criteria identifies one or more frequency bands as "preferred" frequency bands and one or more other frequency bands as "regular" frequency bands. When given a choice, the mobile station 32 in server selection, and the mobile switching center 31 in hand-off, will select channels within a preferred frequency band over channels in regular frequency bands. Unless a further prioritization is programmed into the mobile station 32 selection criteria, no preference is given to one preferred frequency band over another preferred frequency band, or to one regular frequency band over another regular frequency band in either server selection or hand-off. Customary band or channel selection techniques (e.g., signal strength measurement) are used to differentiate and select between commonly prioritized frequency bands. Table 1 below illustrates this technique for implementing frequency band selection criteria.

TABLE 1

| PCS Hyperband - Freq. Bands | Preference Level |
|---|---|
| A | Preferred |
| C | Regular |
| D | Regular |
| F | Preferred |

In the example of Table 1, the mobile station 32 of the present invention will communicate in the PCS hyperband with a preference for channels in the A and F frequency bands. Communication on channels in the C and D frequency bands is allowed, but will only be selected if channels in the preferred A and F frequency bands are not available.

One prioritization technique programmed into the mobile station 32 of the present invention in connection with the selection criteria assigns a priority level to each of a number of specified frequency bands. When given a choice, the mobile station 32 in server selection, and the mobile switching center 31 in hand-off off, will select channels in frequency bands within a higher priority level over other available channels in frequency bands with a relatively lower priority level. It is possible, and in fact common, that two or more available frequency bands will be assigned in the programming with identical priority levels. Customary band or channel selection techniques (e.g., signal strength measurement) are used to differentiate and select between commonly prioritized frequency bands. Table 2 below illustrates this technique for implementing frequency band selection criteria.

TABLE 2

| PCS Hyperband - Freq. Bands | Priority Level |
|---|---|
| A | 2 |
| C | 1 |
| D | 4 |
| F | 3 |

In the example of Table 2, the mobile station 32 of the present invention will communicate in the PCS hyperband with a preference for channels in the C frequency band, followed in order by channels in the A, F and D frequency bands.

Figure 3:
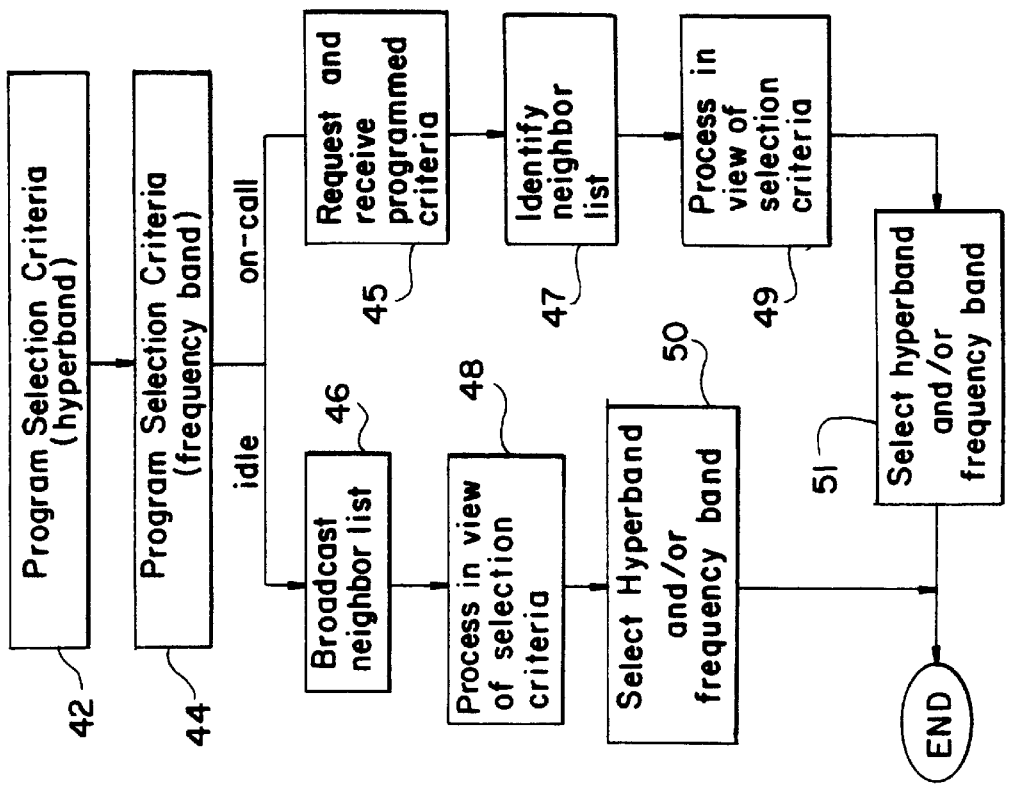
FIG. 3 is a flow diagram illustrating the method for operating a multiple hyperband communications system and mobile stations in accordance with the present invention.

Reference is now made to FIG. 3 wherein there is shown a flow diagram illustrating the method of operation of the multiple hyperband cellular communications system and multiple hyperband mobile station of the present invention. In step 42, each mobile station operating in the system is programmed with hyperband selection criteria. The hyperband selection criteria programmed in step 42 may comprise a restriction of operation to certain ones of the hyperbands, a preference for mobile station operation in certain ones of the hyperbands, and/or a prioritization of mobile station operation for certain ones of the hyperbands. The mobile stations are further programmed with frequency band selection criteria (step 44). The frequency band selection criteria programmed in step 44 may comprise a restriction of mobile station operation to certain ones of the frequency bands, a preference for mobile station operation in certain ones of the frequency bands, and/or a prioritization of mobile station operation for certain ones of the frequency bands.

If the mobile station 32 is in idle operating mode, the system broadcasts to mobile stations a neighbor list identifying neighboring cells across each of the multiple hyperbands available for server selection (step 46). Each mobile station responds to the receipt of the neighbor list by processing the list in view of the programmed hyperband selection criteria (step 48) to select communications operation in one of the cells in a hyperband and a frequency band authorized by the programmed hyperband frequency band selection criteria (step 50).

If the mobile station 32 is in on-call operating mode, the system will request and receive in step 45 the mobile station's programmed selection criteria. The mobile switching center 31 will then identify a neighbor list identifying neighboring cells across each of the hyperbands for hand-off (step 47). The list is processed in view of the received mobile station selection criteria (step 49) to select for hand-off one of the cells in a hyperband and frequency band authorized by the programmed selection criteria (step 51).

Reference is now made to FIGS. 1, 2 and 3 in order to illustrate through a series of examples the operation of the multiple hyperband cellular communications system and mobile station 32 of the present invention. In each of the examples presented herein, it is assumed that a mobile station 32 of the present invention is at location 52 in Cellular hyperband cell 16 and PCS hyperband cell 26.

In a first example, the data storage device 40 of the mobile station 32 at location 52 is programmed having a hyperband programming category of "PCS only". The mobile station 32 at location 52 is further programmed giving identical priority to each of the six available frequency bands of the PCS hyperband. The PCS base station 30 for cell 26 broadcasts over the control channel a neighbor list to the mobile station 32 at location 52 identifying cells 10, 12, 14, 18, 20, 22 and 24 as neighboring cells. It is noted that the neighboring cells include cells in both the Cellular and PCS hyperbands.

As the mobile station 32 at location 52 moves through the service area in a direction towards cells 10 and 20, as generally indicated by arrow 54, the processor 34 and mobile switching center 31 initiate operations known to those skilled in the art for evaluating and possibly selecting a new base station through which communications will be effectuated (i.e., server selection or hand-off). In accordance with the "PCS only" hyperband selection criteria programming of the mobile station 32 at location 52, only PCS cell 20 will be considered by the processor 34 of the mobile station for server selection and the mobile switching center 31 for hand-off. Furthermore, because there are no preferences or priorities programmed with respect to the frequency bands within the PCS hyperband, the processor 34 or mobile switching center 31 will choose frequency bands according to standard selection practices to handle communications. It will, of course be understood that if the mobile station hyperband programming instead specified "Cellular only" that the processor 34 or mobile switching center 31 would have considered only Cellular cell 10 for selection.

In the next example, the same mobile station 32 at location 52 and hyperband programming are assumed, but in this case the frequency band programming provides for frequency bands C and E being "preferred", and all other frequency bands being "regular". With movement of the mobile station 32 at location 52 in the direction of arrow 54, the processor 34 of the mobile station and the mobile switching center 31 will again consider only PCS cell 20 for selection. With respect to frequency band selection within that cell, the mobile station 32 at location 52 and the mobile switching center 31, operating in accordance with the selection criteria programming, will consider selection of, or hand-off to, either one of the C or E frequency bands within the PCS hyperband before selecting or handing-off to any of the other remaining frequency bands.

The next example again assumes the same mobile station 32 at location 52 and hyperband programming, but in this case the frequency band programming provides for frequency band D having a priority level of "1", frequency bands A and E having a priority level of 2, and all remaining frequency bands within the PCS hyperband having a priority level of "3". With movement of the mobile station 32 at location 52 in the direction of arrow 54, the mobile station and mobile switching center 31 will again consider only PCS cell 20 for selection. With respect to frequency band selection, the processor 34 and mobile switching center 31 will follow the programming and consider selection of channels in the D frequency band first, channels in the A and E frequency bands next, and channels in any of the other remaining frequency bands last.

In the next example, the data storage device 40 of the mobile station 32 at location 52 is programmed having a hyperband programming category of "PCS preferred". The mobile station 32 is further programmed giving identical priority to each of the six available frequency bands of the PCS hyperband, and giving "preferred" priority to the A frequency band in the Cellular hyperband. The neighbor list received over the control channel identifies cells 10, 12, 14, 18, 20, 22 and 24 as neighboring cells. It is again noted that the neighboring cells include cells in both the Cellular and PCS hyperbands.

The mobile station 32 at location 52 moves through the service area in a direction towards cells 10 and 20, as generally indicated by arrow 54. In accordance with the "PCs preferred" hyperband selection criteria programming of the mobile station 32, the processor 34 and mobile switching center 31 will give preference to the PCS cell 20 for selection. Furthermore, because there are no preferences or priorities programmed with respect to the frequency bands within the PCS hyperband, standard techniques will be used to choose the best frequency band to handle communications.

In the next example, the same mobile station 32 at location 52 and hyperband programming are assumed, but in this case the mobile station moves in a direction towards Cellular cell 18, as generally indicated by arrow 56. In this case there are no PCS cells for the mobile station 32 to select or for the mobile switching center 31 to hand-off. In accordance with its hyperband programming of "PCS preferred", the mobile station would prefer to operate in the PCS hyperband band, but will instead operate in the Cellular hyperband to maintain communications capabilities. With respect to frequency band selection, the mobile station 32 at location 52 and mobile switching center 31, operating in accordance with the frequency band selection criteria programming, will consider selection of or hand-off to the A frequency band first, but will also consider operation in the B frequency band if communications in the A band cannot be effectuated.

Although the present invention has been described with respect to operation in the Cellular and PCS hyperbands, it will be understood that the disclosed invention may be implemented in and across any of a number of available hyperbands. Thus, although a preferred embodiment of the present invention has been disclosed herein and illustrated in the accompanying Drawings, it is understood that the invention is not limited to the embodiment disclosed, but rather is capable of numerous rearrangements, modifications and substitutions without departing from the spirit of the invention as set forth and defined by the following claims.

What is claimed is:

1. A multiple hyperband cellular communications system, comprising:

a plurality of cells operating in a first hyperband;

a plurality of cells operating in a second hyperband;

a mobile station moving through the cells of the first and second hyperbands and programmed with hyperband selection criteria and operating to transmit its programmed hyperband selection criteria;

means for receiving the mobile station transmitted programmed hyperband selection criteria and operating to process a neighbor list identifying cells in both the first and second hyperbands neighboring the mobile station in view of the received hyperband selection criteria to select for the mobile station a hand-off to one of the neighboring cells and an operation in either the first or second hyperbands.

2. The system as in claim 1 wherein the means for receiving comprises a mobile switching center.

3. The system as in claim 1 wherein the hyperband selection criteria comprises a restriction of mobile station operation to one of the hyperbands, the means for receiving further operating to select a cell for hand-off in accordance with the restriction.

4. The system as in claim 1 wherein the hyperband selection criteria comprises a preference for mobile station operation in one of the hyperbands, the means for receiving further operating to select a cell for hand-off in accordance with the preference.

5. The system as in claim 1 wherein the hyperband selection criteria comprises a prioritization of hyperbands for mobile station operation, the means for receiving further operating to select a cell for hand-off in accordance with the prioritization.

6. A multiple hyperband cellular communications system, comprising:

a plurality of cells operating in a first hyperband;

a plurality of cells operating in a second hyperband, wherein each of the first and second hyperbands includes a plurality of frequency bands therein;

a mobile station moving through the cells of the first and second hyperbands, wherein the mobile station is programmed with hyperband selection criteria and operating to transmit its programmed hyperband selection criteria and the mobile station is further programmed with frequency band selection criteria, the mobile station further operating to transmit the programmed frequency band selection criteria; and means for receiving the mobile station transmitted programmed hyperband selection criteria and operating to process a neighbor list identifying cells in both the first and second hyperbands neighboring the mobile station in view of the received hyperband selection criteria to select for the mobile station a hand-off to one of the neighboring cells and an operation in either the first or second hyperbands, the means for receiving further receiving the transmitted frequency band selection criteria and further operating to process the neighbor list identifying cells in both the first and second hyperbands neighboring the mobile station in view of both the received hyperband selection criteria and the received frequency band selection criteria to select for the mobile station a hand-off to one of the neighboring cells, an operation in either the first or second hyperband, and an operation in a specific frequency band therein.

7. The system as in claim 6 wherein the frequency band selection criteria comprises a restriction of mobile station operation to one of the frequency bands, the means for receiving further operating to select a cell for hand-off in accordance with the restriction.

8. The system as in claim 6 wherein the frequency band selection criteria comprises a preference for mobile station operation in one of the frequency bands, the means for receiving further operating to select a cell for hand-off in accordance with the preference.

9. The system as in claim 6 wherein the frequency band selection criteria comprises prioritization of frequency bands for mobile station operation, the means for receiving further operating to select a cell for hand-off in accordance with the prioritization.

10. A method of operating a multiple hyperband cellular communication system to effectuate a mobile station hand-off, comprising the steps of:

programming each mobile station operating in the system with hyperband selection criteria;

receiving from each mobile station the programmed hyperband selection criteria; and processing a neighbor list identifying cells across each of the multiple hyperbands neighboring a certain mobile station in view of the received hyperband selection criteria for that certain mobile station to select for that certain mobile station a hand-off to one of the neighboring cells and an operation in a selected one of the multiple hyperbands.

11. The method of claim 10 wherein the programmed hyperband selection criteria comprises a restriction of mobile station operation to certain ones of the hyperbands, the step of processing comprising the step of choosing the neighboring cell for hand-off in accordance with the restriction.

12. The method of claim 10 wherein the programmed hyperband selection criteria comprises a preference for mobile station operation in certain ones of the hyperbands, the step of processing comprising the step of choosing the neighboring cell for hand-off in accordance with the preference.

13. The method of claim 10 wherein the programmed hyperband selection criteria comprises a prioritization of mobile station operation for certain ones of the hyperbands, the step of processing comprising the step of choosing the neighboring cell for hand-off in accordance with the prioritization.

14. A method of operating a multiple hyperband cellular communication system to effectuate a mobile station hand-off, comprising the steps of:

programming each mobile station operating in the system with hyperband selection criteria and with frequency band selection criteria;

receiving from each mobile station the programmed frequency band selection criteria and the programmed hyperband selection criteria; and processing a neighbor list identifying cells across each of the multiple hyperbands neighboring a certain mobile station in view of both the received frequency band selection criteria and the received hyperband selection criteria for that certain mobile station to select for the certain mobile station a hand-off to one of the neighboring cells, an operation in one of the multiple hyperbands, and an operation in a specific frequency band therein, wherein each hyperband includes a plurality of frequency bands.

15. The method of claim 14 wherein the programmed frequency band selection criteria comprises a restriction of mobile station operation to certain ones of the frequency bands, the step of processing comprising the step of choosing the neighboring cell for hand-off in accordance with the restriction.

16. The method of claim 14 wherein the programmed frequency band selection criteria comprises a preference for mobile station operation in certain ones of the frequency bands, the step of processing comprising the step of choosing the neighboring cell for hand-off in accordance with the preference.

17. The method of claim 14 wherein the programmed frequency band selection criteria comprises a prioritization of mobile station operation for certain ones of the frequency bands, the step of processing comprising the step of choosing the neighboring cell for hand-off in accordance with the prioritization.

* * * * *